US009626077B2

(12) United States Patent
Lan et al.

(10) Patent No.: US 9,626,077 B2
(45) Date of Patent: Apr. 18, 2017

(54) METHOD, SYSTEM FOR UPDATING DYNAMIC MAP-TYPE GRAPHIC INTERFACE AND ELECTRONIC DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Tzu-Hsiang Lan, New Taipei (TW); Quan-Quan Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 385 days.

(21) Appl. No.: 14/484,215

(22) Filed: Sep. 11, 2014

(65) Prior Publication Data
US 2015/0074567 A1    Mar. 12, 2015

(30) Foreign Application Priority Data
Sep. 11, 2013   (CN) .......................... 2013 1 0409721

(51) Int. Cl.
G06F 3/048      (2013.01)
G06F 3/0482     (2013.01)
G06F 9/44       (2006.01)

(52) U.S. Cl.
CPC .......... G06F 3/0482 (2013.01); G06F 9/4443 (2013.01)

(58) Field of Classification Search
CPC .............. G06F 3/0482; G06F 3/04817; G06F 3/04842; G06F 3/04845; G06F 3/04883
See application file for complete search history.

(56) References Cited

U.S. PATENT DOCUMENTS

| 7,730,422 | B2 | 6/2010 | Russo |
| 2007/0157089 | A1 | 7/2007 | Van Os et al. |
| 2009/0058821 | A1 | 3/2009 | Chaudhri et al. |
| 2009/0138827 | A1* | 5/2009 | Van Os ............... G06F 3/04817 715/846 |
| 2009/0158201 | A1 | 6/2009 | Iampietro et al. |
| 2009/0199134 | A1* | 8/2009 | Murayama ........... G06F 3/0482 715/835 |
| 2010/0138784 | A1* | 6/2010 | Colley ............... G06F 3/04883 715/810 |

(Continued)

FOREIGN PATENT DOCUMENTS

| CN | 102272708 A | 12/2011 |
| CN | 102722406 A | 10/2012 |

*Primary Examiner* — Rashawn Tillery
(74) *Attorney, Agent, or Firm* — Zhigang Ma

(57) ABSTRACT

A dynamic map-type graphic interface includes a number of user interface (UI) components. Each UI component is associated with one corresponding application program of the electronic device. The dynamic map-type graphic interface is a single-layer graphic interface made up of the UI components spliced together and around the center of the dynamic map-type graphic interface. The arrangement of the UI components is dynamically alterable according to operating times of the application program operated under a predetermined state parameter value within a predetermined time period.

18 Claims, 9 Drawing Sheets

(56) References Cited

U.S. PATENT DOCUMENTS

| | | | |
|---|---|---|---|
| 2011/0138328 A1* | 6/2011 | Ge | G06F 3/0482 715/811 |
| 2011/0191611 A1* | 8/2011 | boni ang gaw go | G06F 3/048 713/320 |
| 2011/0209225 A1* | 8/2011 | Nakamura | H04L 63/105 726/27 |
| 2012/0140255 A1* | 6/2012 | Tanaka | G06F 9/445 358/1.13 |
| 2012/0297342 A1* | 11/2012 | Jang | G06F 3/0482 715/823 |
| 2013/0076774 A1* | 3/2013 | Yu | G06F 9/4443 345/589 |
| 2013/0097538 A1* | 4/2013 | Park | G06F 3/04817 715/765 |
| 2013/0152017 A1* | 6/2013 | Song | G06F 9/4443 715/811 |
| 2014/0013271 A1* | 1/2014 | Moore | G06F 3/0482 715/792 |
| 2015/0113457 A1* | 4/2015 | Li | G06F 3/0488 715/765 |

* cited by examiner

| NO. | Application Program | Operation | User Account | Location | Time |
|---|---|---|---|---|---|
| 1 | A | open | Administrator | a | 08:00 AM |
| 2 | A | open | Administrator | a | 08:00 AM |
| 3 | A | open | Administrator | a | 08:00 AM |
| 4 | B | open | Administrator | a | 08:00 AM |
| 5 | C | open | Administrator | a | 08:00 AM |
| 6 | B | open | Administrator | a | 08:00 AM |
| 7 | D | open | Administrator | a | 08:00 AM |
| 8 | B | open | Administrator | a | 08:00 AM |
| 9 | B | open | Administrator | a | 08:00 AM |
| 10 | B | open | Administrator | a | 08:00 AM |
| 11 | A | open | Guest | a | 08:00 AM |
| 12 | B | open | Guest | a | 08:00 AM |
| 13 | E | open | Guest | a | 08:00 AM |
| 14 | F | open | Guest | a | 08:00 AM |
| ... | ... | | ... | ... | ... |

FIG. 6

METHOD, SYSTEM FOR UPDATING DYNAMIC MAP-TYPE GRAPHIC INTERFACE AND ELECTRONIC DEVICE USING THE SAME

FIELD

The present disclosure relates to graphic user interface technologies, and particularly to a dynamic map-type graphic interface, an electronic device providing the dynamic map-type graphic interface, and a method for the electronic device to provide the dynamic map-type graphic interface.

BACKGROUND

User interfaces (UIs) are physical or virtual mediums through which a user interacts with an electronic device. Most UIs of electronic devices use graphic user interface (GUI) components supported in an operating system (OS). The GUIs of electronic devices may have many application icons, such that it is necessary to arrange the application icons in different layers or pages of the GUI.

BRIEF DESCRIPTION OF THE DRAWINGS

Implementations of the present technology will now be described, by way of example only, with reference to the attached figures, wherein:

FIG. 6 is a diagram of an embodiment of a list of operation records stored in a storing unit.

DETAILED DESCRIPTION

Figure 1:
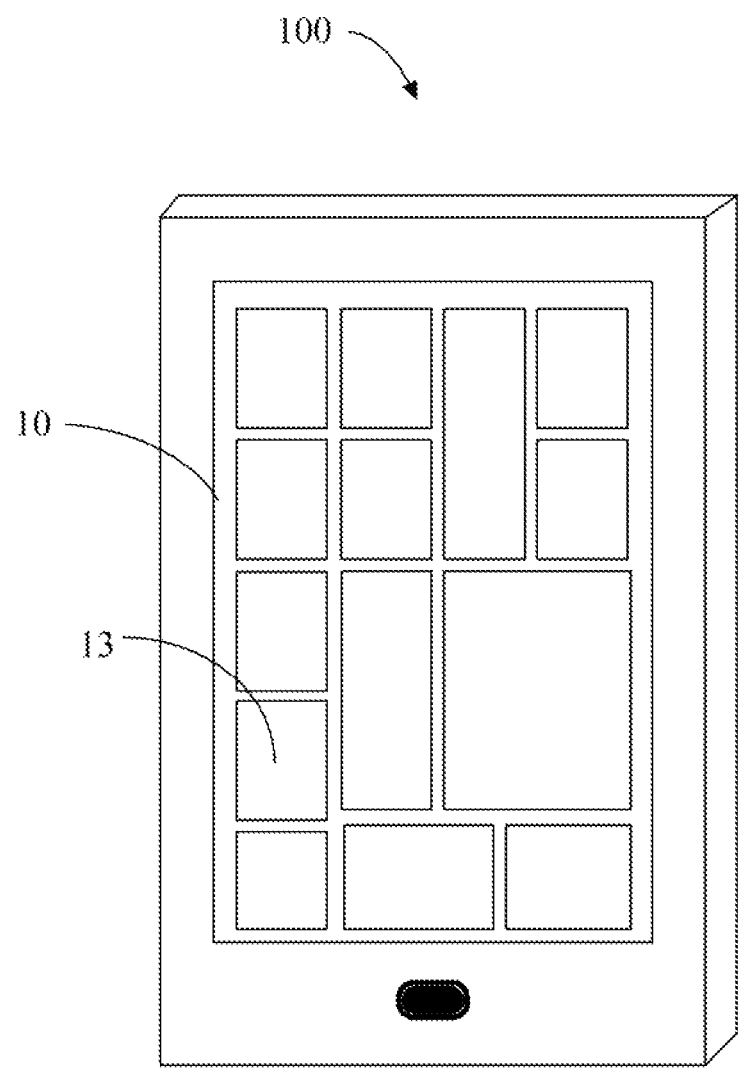
FIG. 1 is a isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to a method and a updating system for dynamically updating a map-type graphical user interface with a plurality of graphical representative icons including:

recording an operation, at an electronic device, when a user is operating an application program;

receiving, at the electronic device, an arrangement parameter from a character of the application program;

determining, at the electronic device by the arrangement parameter, if the graphical representative icon of the application program is dynamically alterable or fixed, wherein if the arrangement parameter is fixed determining a new arrangement of the graphical representative icon;

determining, at the electronic device, one or more operating times of the application program when the application program is operating within a predefined time period associated with the operation;

redefining, at the electronic device, a new arrangement of the graphical representative icon based on the one or more operating times, if the arrangement parameter is dynamically alterable; and updating, based on the new arrangement at the electronic device, the map-type graphical user interface by splicing the plurality of representative icons around a center of the electronic device.

Figure 2:
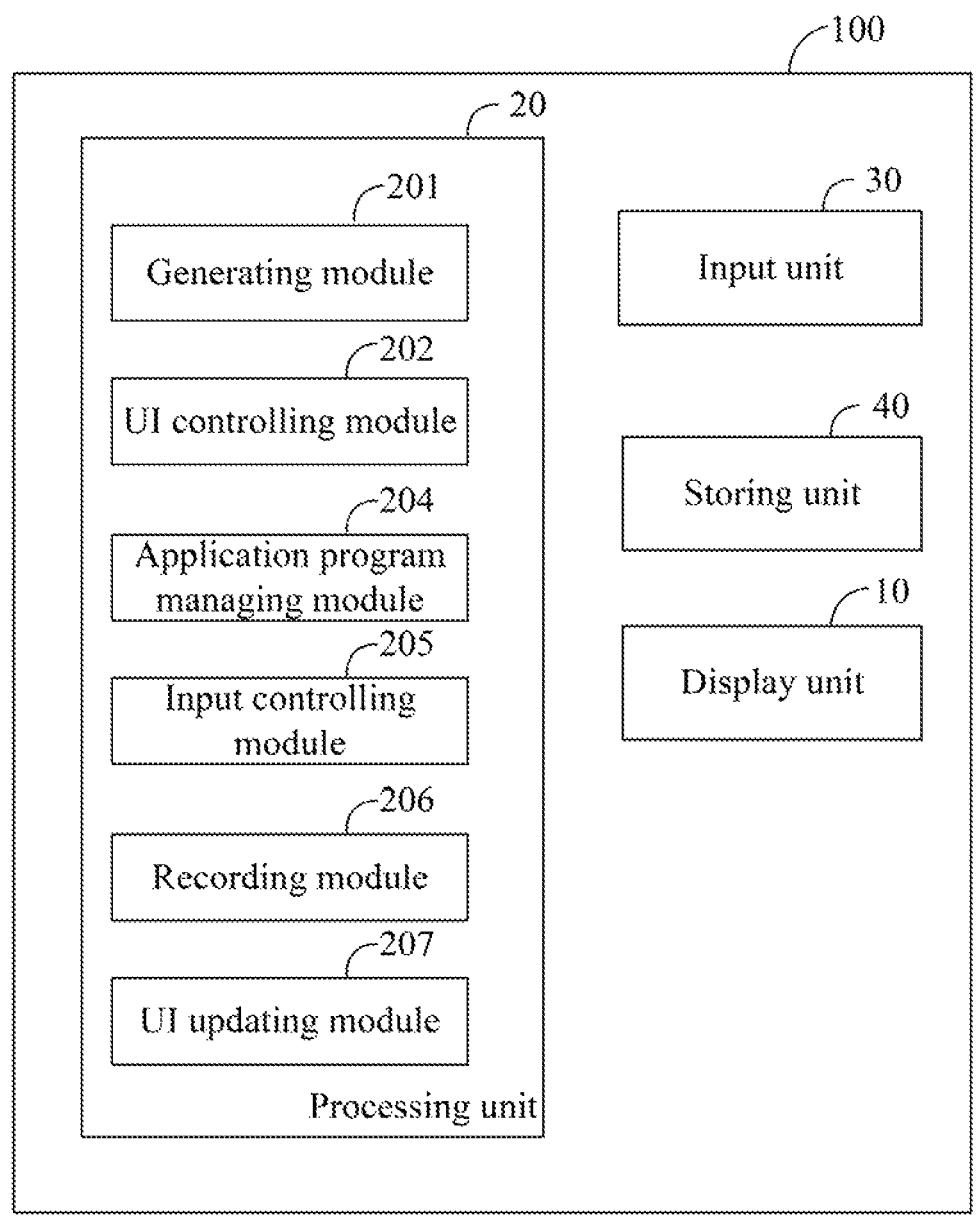
FIG. 2 is a block diagram of the electronic device of FIG. 1.

FIGS. 1 and 2 illustrate an electronic device 100 of one embodiment. The electronic device 100 includes a display unit 10, a processing unit 20, an input unit 30, and a storing unit 40. The display unit 10 of the electronic device 100 can be any size, and the electronic device 100 can be, without limitation, a television, an electronic whiteboard, a desktop personal computer, a notebook, a tablet personal computer, a smart phone, or a device with a display. The electronic device 100 provides a user interface (UI, not labeled) displayed on the display unit 10. A number of UI components 13 are arranged in the UI, the UI components 13 can be arranged in a single layer or in multiple layers.

In this embodiment, the storing unit 40 is a non-transitory computer-readable medium configured to store a number of documents and multimedia files, such as video files, music files, and images. The storing unit 40 further stores a number of application programs and UI components 13 associated with the application programs. The UI components 13 include application icons and different kinds of interactive widgets. Each of the application icons and widgets is associated with a corresponding application program. In one embodiment, the widget is a window for dynamically displaying images or information, such as weather information or time, or a thumbnail of a document, video, or image stored in the storing unit 40. In other embodiments, the widget is an interactive widget configured to provide feedback and display a processing result in response to a manual input. For example, the interactive widget is a currency converter, which includes an input box for receiving input of a currency and a currency amount, and displays a converted result.

The display unit 10 is configured to simultaneously display videos, documents, Internet web pages, a running interface of a program, a UI, and the like. The processing unit 20 is configured to run the application programs and control the display unit 10. The storing unit is further configured to store software instruments. The software instruments are run by the processing unit 20 for enabling the electronic device 100 to implement a dynamic map-type graphic interface 12 (shown in FIG. 3).

The input unit 30 can be selected from a contactless input device or a contact-type input device. The contactless input device can be a wireless control technology, such as gesture control technology or voice control technology. The contact-type input device can be a touch input device, such as a capacitive touch screen, a resistive touch screen, an Infrared touch screen, or other optical touch input devices, or other type of input device, such as a keyboard or a button.

The processing unit 20 includes a generating module 201, a UI controlling module 202, an application program managing module 204, an input controlling module 205, a recording module 206 and a UI updating module 207.

Figure 3:
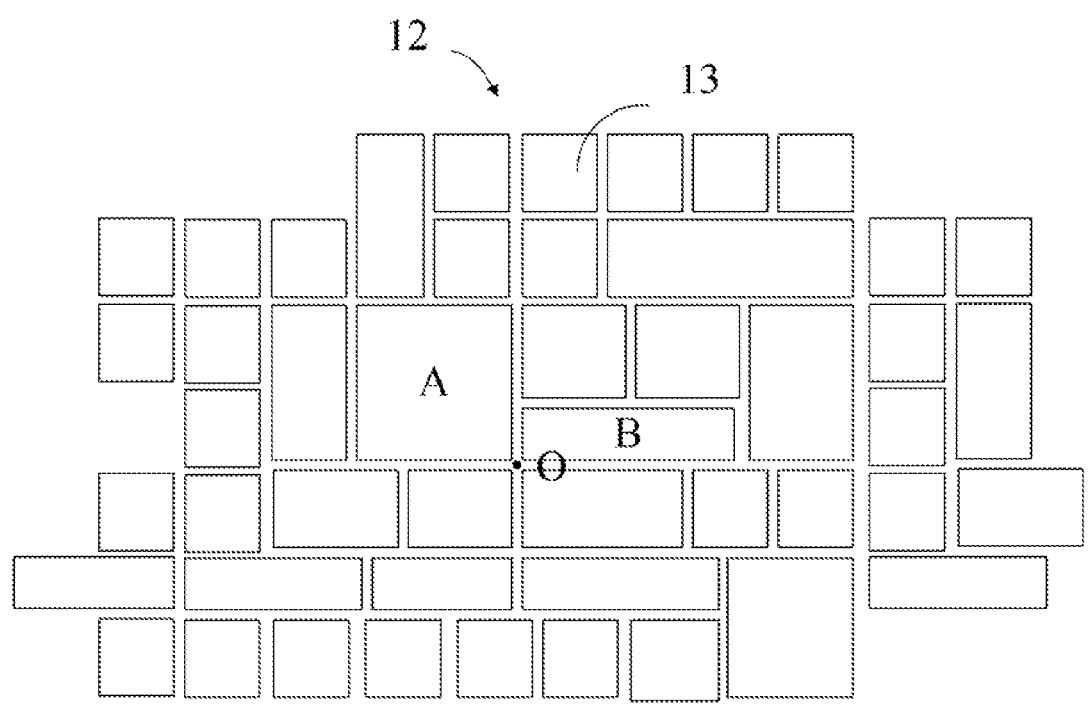
FIG. 3 is a diagrammatic view of an embodiment of a dynamic map-type graphic interface.

FIG. 3 illustrates an embodiment of a dynamic map-type graphic interface 12. The dynamic map-type graphic interface 12 is made up of the UI components 13 on a single layer. The UI components 13 are dynamically arranged according to a predetermined rule. Each of the UI components 13 is associated with one application program.

In this embodiment, the UI components 13 are arranged around a predetermined center O and spliced together to form the dynamic map-type graphic interface 12. A size of the dynamic map-type graphic interface 12 increases as the number of the UI components 13 increases. Each of the UI components 13 is a block of the map. A size, shape, and content of the block are determined by a character of the associated application program, or set by a user.

The size of the UI component 13 is measured by a predetermined unit of measure.

In one embodiment, 1 unit is defined as 0.2 inch. For example, if the size of a UI component 13 is 1×4, the horizontal size of the UI component 13 is 0.2 inch, and the vertical size of the UI component 13 is 0.8 inch.

In another embodiment, the size of the UI component 13 is defined by pixel values. For example, if the size of the UI component 13 is 50×50, the horizontal size and the vertical size of the UI component 13 are both 50 pixels.

For example, a block A of the dynamic map-type graphic interface 12 is an application program for the weather and has a 3×3 size. Therefore, the horizontal size and the vertical size of the block A are both 0.6 inch. The content of the block A can include a static or dynamic image showing weather information of a city.

The UI components 13 are arranged around the predetermined center O according to the predetermined rule and spliced together. The UI components 13 are spliced together means that the UI components 13 are arranged around the center one by one according to the predetermined rule. The UI components 13 can be arranged closer to the center O according to a frequency of use, a time of installation, or other condition defined by a user. In other embodiments, arrangement of the UI components 13 on the dynamic map-type graphic interface 12 is random or determined by a user.

Figure 4:
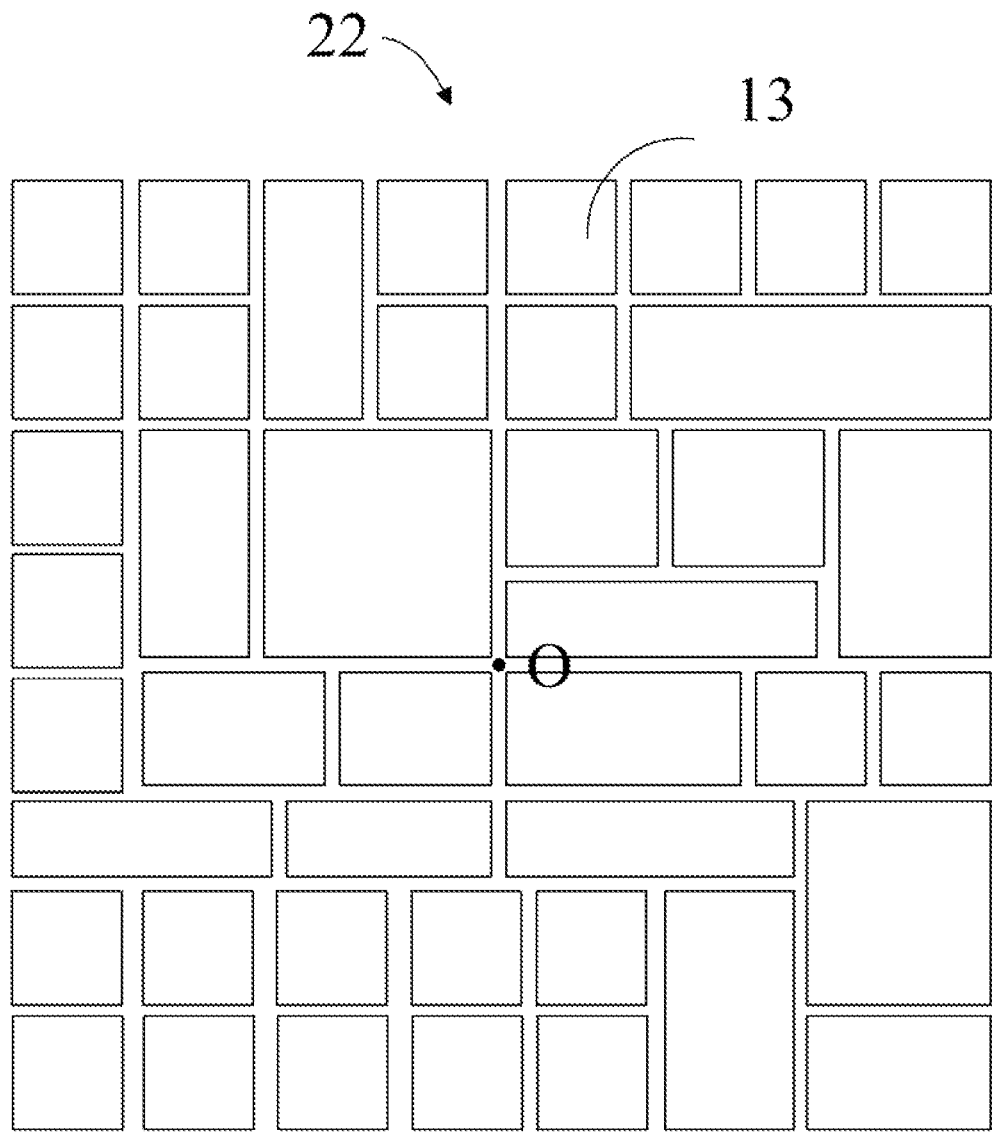
FIG. 4 is a diagrammatic view of another embodiment of a dynamic map-type graphic interface.

FIG. 4 illustrates another embodiment of a dynamic map-type graphic interface 22. A difference between the dynamic map-type graphic interface 22 and the dynamic map-type graphic interface 12 of the first embodiment is that the dynamic map-type graphic interface 22 is rectangular and has a fixed aspect ratio. As the number of the UI components 13 increases, the size of the rectangle increases to maintain the fixed aspect ratio of the dynamic map-type graphic interface 22.

Figure 5:
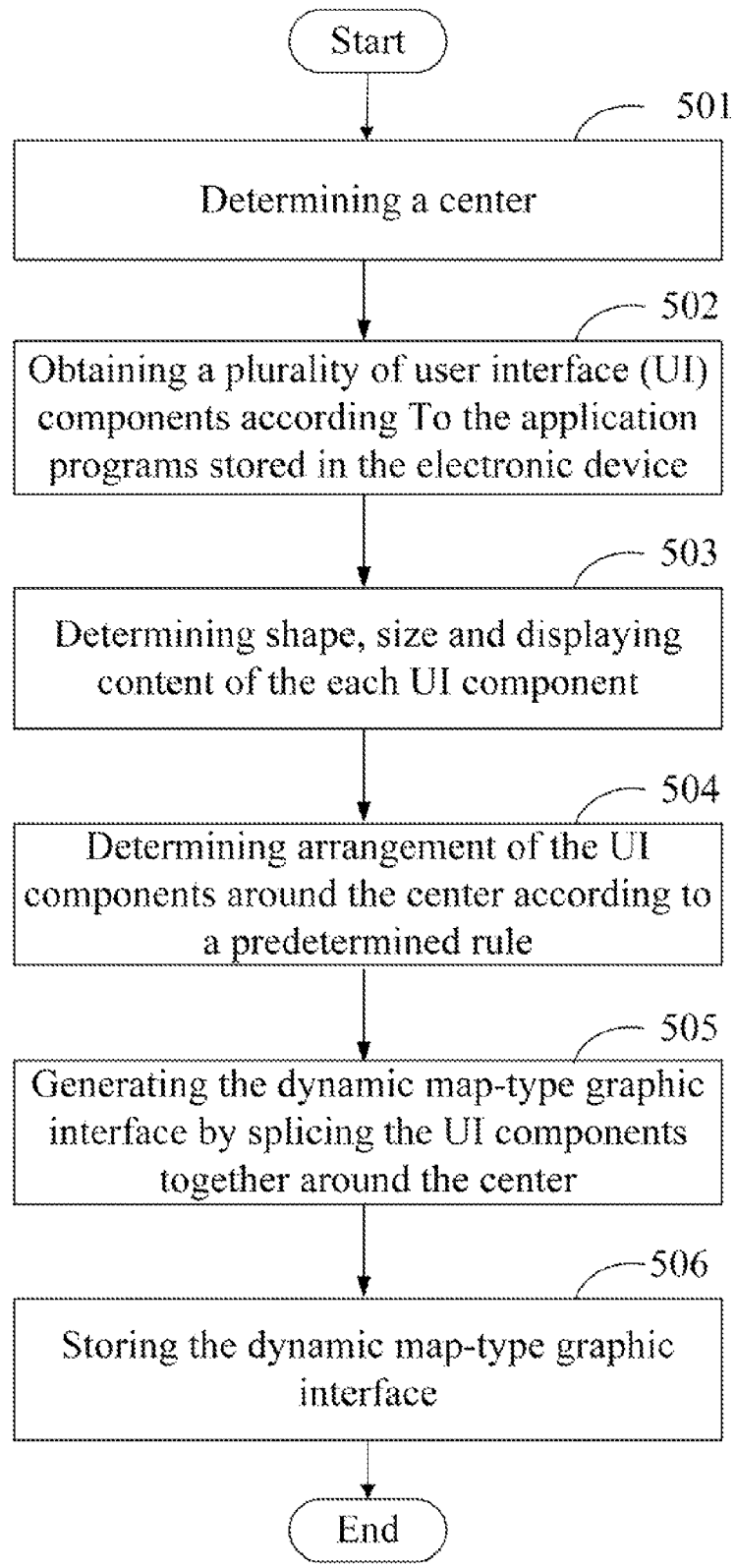
FIG. 5 is a flowchart of an embodiment of a method for providing the dynamic map-type graphic interface.

FIG. 5 illustrates a flowchart of a method for providing the dynamic map-type graphic interface 12.

In block 501, the generating module 201 determines a center O.

In block 502, the application program managing module 204 obtains the number of the UI components 13 according to the application programs stored in the electronic device 100.

In block 503, the application program managing module 204 determines the shape, size, and content of each UI component 13 according to the character of the application program associated with each UI component 13, or according to user input.

In block 504, the generating module 201 determines the arrangement of the UI components 13 around the center O according to the predetermined rule. In other embodiments, the arrangement of the UI components 13 is random or determined by a user.

In block 505, the generating module 201 generates the dynamic map-type graphic interface 12 by splicing the UI components 13 together around the center O.

In block 506, the dynamic map-type graphic interface 12 is stored in the storing unit 40 of the electronic device 100.

In other embodiments, the generating module 201 splices the UI components 13 together around the center O to form a dynamic picture.

The application program managing module 204 is further configured to update a character of the associated application program. The character of the associated application program includes size parameter, shape parameter, content parameter and arrangement parameter of the corresponding UI components 13.

The arrangement parameter of the character of the application program records location character and location information. The location character is configured to define whether the arrangement of the corresponding UI component 13 on the dynamic map-type graphic interface 12 is fixed or dynamically alterable. The location information is configured to define the arrangement of the UI component 13 on the dynamic map-type graphic interface 12.

In an embodiment, the location character is "fixed", the location of the block of the UI component 13 on the dynamic map-type graphic interface 12 is fixed. In another embodiment, the location character is "dynamically alterable", the location of the block of the UI component 13 on the dynamic map-type graphic interface 12 is dynamically alterable.

The arrangement parameter can be set by the associated application program or set manually. In an embodiment, when the user changes the location of the UI component 13 on the dynamic map-type graphic interface 12, the application program managing module 204 records the changed location of the UI component 13, and replaces the changed location as the location information in the corresponding arrangement parameter with the old one.

The recording module 206 is configured to record an operation record when a user operates the application program on the electronic device 100. The operation record includes an operation of the application program operating by the user and a state parameter. The state parameter includes one or more parameters selected from a name of the application program, a current user account name of the electronic device 100, current location information of the electronic device 100 and a current time value, et al. The operation record is stored in the storing unit 40.

Usually, the electronic device 100, such as smart phone, is equipped with Global Position System (GPS) module configured to determine location of the electronic device 100. In other embodiments, a WIFI module, or a mobile communication module of the electronic device 100 can be employed to determine the location of the electronic device 100. This manner of locating technical is well known in the art.

For example, when user opens an application program as an "Administrator" on the electronic device 100, the operated application is "Camera", the operating time is "08:00 AM", the GPS module obtains the current location information is "city A, block B, street C". The recording module 206 records the operation "open", the name "Camera", the current user account name "Administrator", the current location information "city A, block B, street C" and the current time value "08:00 AM", and stores the above values as a operation record in the storing unit 40.

The UI updating module 207 is configured to redefine a new arrangement of the UI component 13 on the dynamic map-type graphic interface 12.

When the location character of the arrangement parameter of the associated application program is "fixed", the UI updating module 207 determines the new arrangement of the UI components 13 according to the location information of the arrangement parameter of the character of the associated application program. Namely, in this embodiment, if the location character of an application program is "fixed", the arrangement of the associated UI components 13 remains the same.

When the location character of the arrangement parameter of the character of the associated application program is "dynamically alterable", the UI updating module 207 is configured to redefine the new arrangement of the associated UI components 13 according the operation records recorded by the recording module 206.

The UI updating module 207 is configured to determine operating times of an application program operated under a predetermined state parameter value within a predetermined time period according to the operation records, and redefine the new arrangement of the UI components 13 of the associated application program according to the operating times. In an embodiment, the UI updating module 207 determines the new arrangement of the UI components 13 of the associated application program closer to the center O according to more operating times. In another embodiment, the UI updating module 207 determines the new arrangement of the UI components 13 of the associated application program away from the center O according to lower operating times. The higher operating times means a high frequency of use.

The predetermined state parameter can be one or more parameters set by a user or selected from the state parameters of the operation record. For example, the predetermined state parameter can be a time period set by the user, a predetermined user account name of the electronic device 100, or a predetermined location of the electronic device 100.

FIG. 6 illustrates an example of a list of operation records stored in a storing unit 40. Take this list for example, assume the predetermined state parameter is the account name "Administrator", the predetermined time period is 10 days.

The UI updating module 207 determines that the operating times of an application program "A" operated by the user "Administrator" within the last 10 days is 3, the operating times of an application program "B" operated by the user "Administrator" within the last 10 days is 5, the operating times of an application program "C" operated by the user "Administrator" within the last 10 days is 1, the operating times of an application program "D" operated by the user "Administrator" within the last 10 days is 1.

The UI updating module 207 redefines the new arrangement of the UI component 13 of the associated application program "B" within a R1 radius around the center O for the operation times of the application program "B" has highest frequency of use, redefines the arrangement of the UI component 13 of the associated application program "A" within a R2 radius around the center O, redefines the arrangement of the UI component 13 of the associated application program "C" and "D" within a R3 radius around the center O. The radius R3 is greater than the radius R2 and the radius R1, the radius R2 is greater than the radius R1.

The generating module 201 updates the dynamic map-type graphic interface 12 by splicing the UI components 13 together around the center O according to the new arrangement of the UI components 13 determined by the UI updating module 207, and stores the updated dynamic map-type graphic interface in the storing unit 40. In an embodiment, the generating module 201 generates a new dynamic map-type graphic interface by splicing the UI components 13 together around the center O according to the new arrangement of the UI components 13, thus to update the dynamic map-type graphic interface 12.

Figure 7:
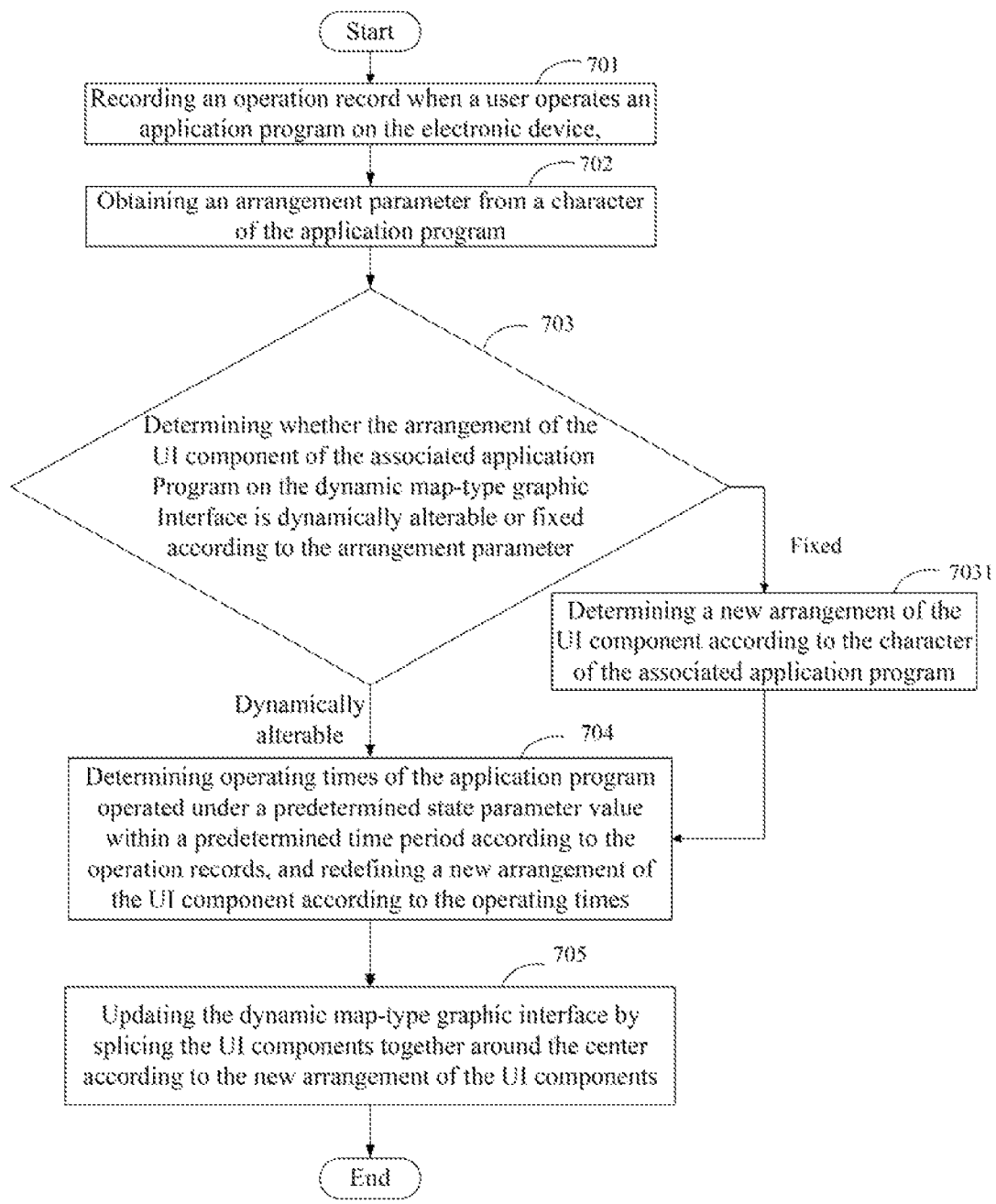
FIG. 7 is a flowchart of an embodiment of a method for updating the dynamic map-type graphic interface.

FIG. 7 illustrates a flowchart of an embodiment of a method for updating the dynamic map-type graphic interface 12.

In block 701, the recording module 206 records an operation record when a user operates the application program on the electronic device 100, the operation record includes an operation of the application program operating by the user and a state parameter. The recording module 206 further stores the operation record in the storing unit 40. In an embodiment, block 21 further includes block of: the application program managing module 204 recording a changed location of the UI component in response to manual input to change the location of the UI component on the dynamic map-type graphic interface, and replace the changed location as a new location information in the corresponding arrangement parameter with the original location information.

In block 702, the application program managing module 204 obtains arrangement parameter from the character of the application program.

In block 703, the UI updating module 207 determines whether the arrangement of the UI component 13 of the associated application program on the dynamic map-type graphic interface 12 is dynamically alterable or fixed according to the arrangement parameter of the character of the associated application program. If the UI updating module 207 determines that the arrangement of the component 13 is dynamically alterable, goes to block 704; if the UI updating module 207 determines that the arrangement of the component 13 is fixed, goes to block 7031.

In block 7031, the UI updating module 207 determines a new arrangement of the UI components 13 according to the character of the associated application program.

In block 704, the UI updating module 207 determines operating times of the application program operated under a predetermined state parameter value within a predetermined time period according to the operation records, and redefines a new arrangement of the UI components 13 of the associated application program according to the operating times. In this embodiment, the UI updating module 207 determines the new arrangement of the UI components 13 of the associated application program closer to the center O according to more operating times.

In block 705, the generating module 201 updates the dynamic map-type graphic interface 12 by splicing the UI components 13 together around the center O according to the new arrangement of the UI components 13 determined by the UI updating module 207, and stores the updated dynamic map-type graphic interface in the storing unit 40.

Figure 8:
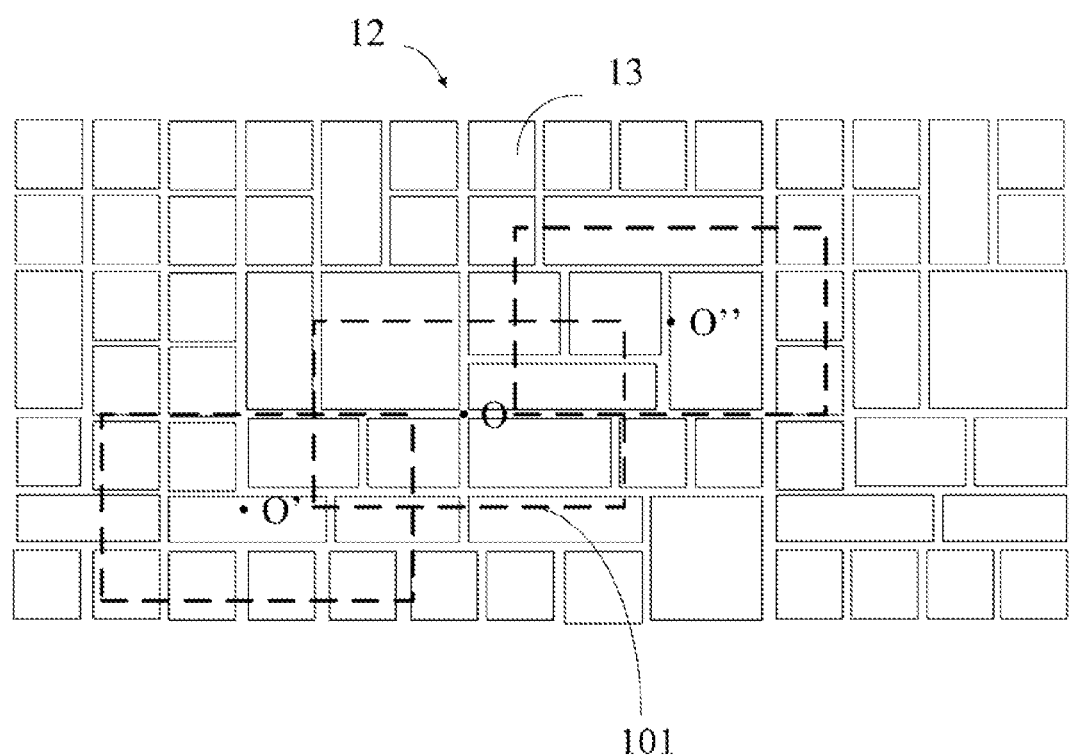
FIG. 8 a diagrammatic view of an embodiment of a moving process of the dynamic map-type graphic user interface.

FIG. 8 illustrates when the size of the dynamic map-type graphic interface 12 is larger than a display size of the display unit 10, the UI controlling module 202 of the processing unit 20 determines a point of the dynamic map-type graphic interface 12 as a display center, then controls the display unit 10 to display a partial region 101 of the dynamic map-type graphic interface 12 centered around the display center. In this embodiment, a size of the partial region 101 is the size of the display unit 10.

In this embodiment, the center O is determined as the display center. In other embodiments, any point of the map-type graphic interface 12, such as a point O' or a point O", can be defined as the current display center. The current display center can be the most recent display center or be set by a user.

The input unit 30 is configured to receive a manual input and generate an input command in response to the input. The input controlling module 205 of the processing unit 20 generates corresponding control signals according to the different input commands. The UI controlling module 202 controls the display center of the dynamic map-type graphic interface 12 to move according to the control signal when the input command is the movement command.

For example, as shown in FIG. 8, The UI controlling module 202 controls the display center of the dynamic map-type graphic interface 12 to move from the center O to the point O' or O", then the partial region 101 is moved accordingly to center around the point O' or the point O".

For example, if the input unit 30 is a touch panel, when the user swipes the touch panel, the input unit 30 generates the corresponding input command. The input controlling module 205 determines a distance and a direction of the swipe, and generates the control signal according to the movement command. The control signal includes information of the distance and the direction of the swipe. The UI controlling module 202 determines a moving distance and a moving direction according to the control signal, and controls the display center of the dynamic map-type graphic interface 12 to move according to the determined moving direction and the determined moving distance.

In one embodiment, the moving direction is the same as the swiping direction, and the moving distance is proportional to the swiping distance. For example, when the swiping distance is 0.5 cm, the determined moving distance is 1 unit.

In another embodiment, the moving direction is opposite to the swiping direction.

When the display center is adjacent to a boundary of the dynamic map-type graphic interface 12, the UI controlling module 202 redefines the display center, such that the partial region 101 is within the dynamic map-type graphic interface 12.

Figure 9:
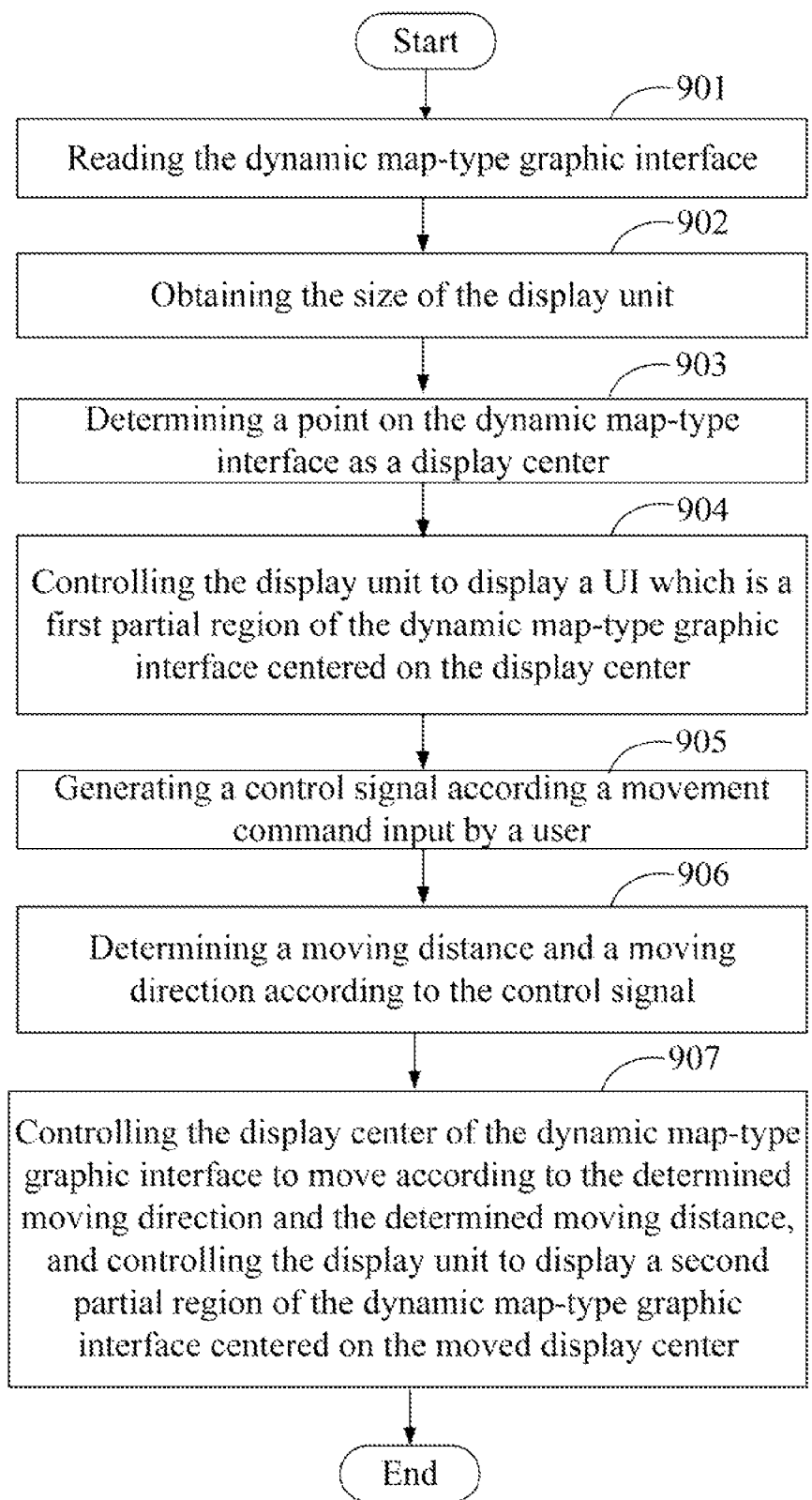
FIG. 9 is a flowchart of an embodiment of a control method for controlling a user interface of the electronic device employing the dynamic map-type graphic interface.

FIG. 9 illustrates a flowchart of a method for controlling the partial region 101 displayed on the electronic device 100. The method includes the following blocks, In block 901, the UI controlling module 202 reads the dynamic map-type graphic interface 12 from the storing unit 40.

In block 902, the UI controlling module 202 obtains the size of the display unit 10. In one embodiment, the UI controlling module 202 further determines whether the size of the display unit 10 is larger than the size of the dynamic map-type graphic interface 12. If the size of the display unit 10 is larger than the size of the dynamic map-type graphic interface 12, block 903 is implemented. Otherwise, the UI controlling module 202 controls the display unit 10 to display the content of dynamic map-type graphic interface 12.

In block 903, the UI controlling module 202 determines a point on the dynamic map-type interface as a display center. In this embodiment, the UI controlling module 202 determines the center O of the dynamic map-type graphic interface 12 as the display center. In other embodiments, any point selected by a user or the most recent display center can be defined as the current display center.

In block 904, the UI controlling module 202 controls the display unit 10 to display the partial region 101 of the dynamic map-type graphic interface 12 to be centered around the display center.

In block 905, the input controlling module 205 generates a control signal according to a movement command input by a user.

In block 906, the UI controlling module 202 determines a moving distance and a moving direction according to the control signal.

In block 907, the UI controlling module 202 controls the display center of the dynamic map-type graphic interface 12 to move according to the determined moving direction and the determined moving distance, and controls the display unit 10 to display the partial region 101 centered around the moving display center.

The dynamic map-type graphic interface 12 is a single-layer graphic interface made up of the UI components 13 spliced together. The UI components 13 are dynamically arranged around the center O. Furthermore, the dynamic map-type graphic interface 12 is compatible with different electronic devices having different display sizes.

The embodiments shown and described above are only examples. Many details are often found in the art such as the other features of a protection case. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for dynamically updating a map-type graphical user interface with a plurality of graphical representative icons comprising:

recording an operation, at an electronic device, when a user is operating an application program;

receiving, at the electronic device, an arrangement parameter from a character of the application program;

determining, at the electronic device by the arrangement parameter, if the graphical representative icon of the application program is dynamically alterable or fixed, wherein if the arrangement parameter is fixed determining a new arrangement of the graphical representative icon;

determining, at the electronic device, one or more operating times of the application program when the application program is operating within a predefined time period associated with the operation;

redefining, at the electronic device, a new arrangement of the graphical representative icon based on the one or more operating times, if the arrangement parameter is dynamically alterable; and updating, based on the new arrangement at the electronic device, the map-type graphical user interface by splicing the plurality of representative icons around a center of the electronic device.

2. The method of claim 1, wherein the arrangement parameter of the character of the application program comprises a location character defining whether the arrangement of the corresponding UI component on the dynamic map-type graphic interface is fixed or dynamically alterable, and a location information determining the arrangement of the UI component on the dynamic map-type graphic interface.

3. The method of claim 2, further comprising step of:
recording, at the electronic device, a changed location of the UI component, when the user is changing the location of the UI component on the dynamic map-type graphic interface; and
replacing, at the electronic device, the changed location as a new location information in the corresponding arrangement parameter with the original location information.

4. The method of claim 1, wherein a state parameter comprises one or more parameters selected from a name of the operated application program, a current user account name of the electronic device, a current location information of the electronic device and a current time value.

5. The method of claim 4, wherein a predetermined state parameter is one or more parameter set by a user or selected from the state parameters of the operation record.

6. The method of claim 1, wherein the new arrangement of the UI components of the associated application program is redefined closer to the center according to more operating times, when the arrangement of the UI component of the associated application program on the dynamic map-type graphic interface is dynamically alterable.

7. An electronic device, comprising:
a display unit;
a processing unit; and
a storing unit configured to store a plurality of application programs and user interface (UI) components associated with the application programs, and a dynamic map-type graphic interface made up of the UI components spliced together around a center;
wherein the storing unit is further configured to store a plurality of instructions, which when executed by the processing unit, causes the processing unit to:
recording an operation, at an electronic device, when a user is operating an application program;
receiving, at the electronic device, an arrangement parameter from a character of the application program;
determining, at the electronic device by the arrangement parameter, if the graphical representative icon of the application program is dynamically alterable or fixed, wherein if the arrangement parameter is fixed determining a new arrangement of the graphical representative icon;
determining, at the electronic device, one or more operating times of the application program when the application program is operating within a predefined time period associated with the operation;

redefining, at the electronic device, a new arrangement of the graphical representative icon based on the one or more operating times, if the arrangement parameter is dynamically alterable; and updating, based on the new arrangement at the electronic device, the map-type graphical user interface by splicing the plurality of representative icons around a center of the electronic device.

8. The electronic device of claim 7, wherein the arrangement parameter of the character of the application program comprises a location character defining whether the arrangement of the corresponding UI component on the dynamic map-type graphic interface is fixed or dynamically alterable, and a fixed location information determining the arrangement of the UI component on the dynamic map-type graphic interface.

9. The electronic device of claim 8, further comprising step of:
recording, at the electronic device, a changed location of the UI component, when the user is changing the location of the UI component on the dynamic map-type graphic interface; and
replacing, at the electronic device, the changed location as a new location information in the corresponding arrangement parameter with the original location information.

10. The electronic device of claim 7, wherein a state parameter comprises one or more parameters selected from a name of the operated application program, a current user account name of the electronic device, a current location information of the electronic device and a current time value.

11. The electronic device of claim 10, wherein a predetermined state parameter is one or more parameter set by a user or selected from the state parameters of the operation record.

12. The electronic device of claim 7, wherein the new arrangement of the UI components of the associated application program is redefined closer to the center according to more operating times, when the arrangement of the UI component of the associated application program on the dynamic map-type graphic interface is dynamically alterable.

13. An updating system for updating a dynamic map-type graphic interface of an electronic device, the dynamic map-type graphic interface comprising a plurality of UI components spliced together around a center; the updating system comprising:
a recording module configured to record an operation record when a user operates an application program on the electronic device, wherein the operation record comprises an operation of the application program operating by the user and a state parameter;
an application program managing module configured to obtain an arrangement parameter from a character of the application program;
a UI updating module configured to determine whether the arrangement of the UI component of the associated application program on the dynamic map-type graphic interface is dynamically alterable or fixed according to the arrangement parameter; and determine a new arrangement of the UI component according to the character of the associated application program, when the arrangement of the UI component of the associated application program on the dynamic map-type graphic interface is fixed; and determine operating times of the application program operated under a predetermined state parameter value within a predetermined time period according to the operation records, and redefining a new arrangement of the UI component according to the operating times, when the arrangement of the UI component of the associated application program on the dynamic map-type graphic interface is dynamically alterable; and a generating module configured to update the dynamic map-type graphic interface by splicing the UI components together around the center according to the new arrangement of the UI components.

14. The updating system of claim 13, wherein the arrangement parameter of the character of the application program comprises a location character defining whether the arrangement of the corresponding UI component on the dynamic map-type graphic interface is fixed or dynamically alterable, and a fixed location information determining the arrangement of the UI component on the dynamic map-type graphic interface.

15. The updating system of claim 14, further comprising step of: recording a changed location of the UI component in response to user's input of changing the location of the UI component on the dynamic map-type graphic interface, and replacing the changed location as a new location information in the corresponding arrangement parameter with the original location information.

16. The updating system of claim 13, wherein a state parameter comprises one or more parameters selected from a name of the operated application program, a current user account name of the electronic device, a current location information of the electronic device and a current time value.

17. The updating system of claim 16, wherein a predetermined state parameter is one or more parameter set by a user or selected from the state parameters of the operation record.

18. The updating system of claim 13, wherein the new arrangement of the UI components of the associated application program is redefined closer to the center according to more operating times, when the arrangement of the UI component of the associated application program on the dynamic map-type graphic interface is dynamically alterable.

* * * * *